(12) United States Patent
Huang et al.

(10) Patent No.: US 11,153,666 B2
(45) Date of Patent: Oct. 19, 2021

(54) METHOD AND APPARATUS FOR RELEASING VIDEO FILE

(71) Applicant: HONG KONG LIVEME CORPORATION LIMITED, Hong Kong (CN)

(72) Inventors: Ruimin Huang, Camana Bay (KY); Pengbo Yang, Camana Bay (KY); Wei Liu, Camana Bay (KY); Hang Wei, Camana Bay (KY); Shuaifeng Deng, Camana Bay (KY); He Li, Camana Bay (KY); Qingjie Zhang, Camana Bay (KY); Hao Tian, Camana Bay (KY); Chao Wang, Camana Bay (KY); Jun Peng, Camana Bay (KY); Zhen Li, Camana Bay (KY); Qi Xu, Camana Bay (KY); Yiqing Huang, Camana Bay (KY)

(73) Assignee: JOYME PTE. LTD., Singapore (SG)

( * ) Notice: Subject to any disclaimer, the term of this patent is extended or adjusted under 35 U.S.C. 154(b) by 406 days.

(21) Appl. No.: 16/307,891

(22) PCT Filed: Oct. 19, 2017

(86) PCT No.: PCT/CN2017/106898
§ 371 (c)(1),
(2) Date: Dec. 6, 2018

(87) PCT Pub. No.: WO2019/024257
PCT Pub. Date: Feb. 7, 2019

(65) Prior Publication Data
US 2021/0029421 A1    Jan. 28, 2021

(30) Foreign Application Priority Data
Aug. 3, 2017 (CN) .......................... 201710657211.6

(51) Int. Cl.
*H04N 21/8549* (2011.01)
*H04N 21/234* (2011.01)
(Continued)

(52) U.S. Cl.
CPC ....... *H04N 21/8549* (2013.01); *H04N 21/234* (2013.01); *H04N 21/23424* (2013.01);
(Continued)

(58) Field of Classification Search
None
See application file for complete search history.

(56) References Cited

U.S. PATENT DOCUMENTS 5,945,987 A * 8/1999 Dunn ................ H04N 7/17318
                                                           715/718
7,823,056 B1 * 10/2010 Davey .................... G11B 27/34
                                                           715/202
(Continued)

FOREIGN PATENT DOCUMENTS

CN    102209259 A    10/2011
CN    104540000 A    4/2015
(Continued)

Primary Examiner — Ricky Chin
(74) Attorney, Agent, or Firm — Cozen O'Connor

(57) ABSTRACT

The embodiments of the present application provide a method and an apparatus for releasing a video file, which are applied to a server. The method comprises obtaining a video file to be released; selecting a first preset number of video frames in the video file to be released; generating a target video file using the selected video frames; determining a target display position for the target video file in a video preview interface; and storing the correspondence between the target display position and the target video file so that a first terminal logging in the server plays the target video file at the target display position in the video preview interface based on the correspondence. As can be seen, since the first terminal plays the target video file at the target display
(Continued)

position in the video preview interface, the user can get more information about the content of the video file to be released from the target video file, so that the user experience is improved.

18 Claims, 4 Drawing Sheets

(51) Int. Cl.
  *H04N 21/278* (2011.01)
  *H04N 21/8545* (2011.01)
  *H04N 21/458* (2011.01)
(52) U.S. Cl.
  CPC ......... *H04N 21/278* (2013.01); *H04N 21/458* (2013.01); *H04N 21/8545* (2013.01)

(56) References Cited

U.S. PATENT DOCUMENTS

| | | | |
|---|---|---|---|
| 9,081,491 B2* | 7/2015 | Tsaregorodtsev | G06F 3/04883 |
| 9,263,089 B2* | 2/2016 | Abe | G11B 27/005 |
| 9,532,004 B1* | 12/2016 | Metter | H04N 7/155 |
| 2003/0103566 A1 | 6/2003 | Stenzel | |
| 2005/0175314 A1* | 8/2005 | Hu | H04N 21/23406 |
| | | | 386/344 |
| 2007/0250896 A1* | 10/2007 | Parker | H04N 7/163 |
| | | | 725/135 |
| 2008/0141126 A1* | 6/2008 | Johnson | G06F 40/106 |
| | | | 715/273 |
| 2008/0155421 A1* | 6/2008 | Ubillos | G11B 27/10 |
| | | | 715/724 |
| 2010/0242066 A1* | 9/2010 | Tseng | H04N 21/6587 |
| | | | 725/38 |
| 2011/0314379 A1* | 12/2011 | Ubillos | G06F 3/0486 |
| | | | 715/721 |
| 2012/0328265 A1* | 12/2012 | Sakuragi | G11B 27/105 |
| | | | 386/278 |
| 2014/0223305 A1* | 8/2014 | Nakano | H04N 5/23277 |
| | | | 715/719 |
| 2014/0223306 A1* | 8/2014 | McIntosh | G11B 27/34 |
| | | | 715/719 |
| 2014/0317245 A1* | 10/2014 | Lou | H04L 65/60 |
| | | | 709/219 |
| 2014/0355738 A1* | 12/2014 | O'Neill | G03B 42/021 |
| | | | 378/62 |
| 2015/0320299 A1* | 11/2015 | Krupnik | A61B 1/00045 |
| | | | 348/65 |
| 2015/0350729 A1* | 12/2015 | Reynolds | H04N 21/47217 |
| | | | 725/34 |
| 2016/0165173 A1* | 6/2016 | Lesh | G11B 27/105 |
| | | | 386/241 |
| 2016/0345052 A1* | 11/2016 | Wang | H04N 21/47202 |
| 2017/0134776 A1* | 5/2017 | Ranjeet | G11B 27/031 |
| 2018/0190323 A1* | 7/2018 | de Jong | G11B 27/034 |
| 2020/0066305 A1* | 2/2020 | Spence | H04N 21/8549 |
| 2021/0029410 A1* | 1/2021 | Huang | H04N 21/4316 |
| 2021/0029421 A1* | 1/2021 | Huang | H04N 21/278 |

FOREIGN PATENT DOCUMENTS

| | | |
|---|---|---|
| CN | 104918095 A | 9/2015 |
| CN | 104936032 A | 9/2015 |
| CN | 105159639 A | 12/2015 |
| CN | 105992068 A | 10/2016 |
| CN | 106210608 A | 12/2016 |
| CN | 106412621 A | 2/2017 |
| CN | 106777116 A | 5/2017 |

* cited by examiner

METHOD AND APPARATUS FOR RELEASING VIDEO FILE

The present application claims the priority to a Chinese patent application No. 201710657211.6, filed with the State Intellectual Property Office of People's Republic of China on Aug. 3, 2017 and entitled "Method and apparatus for releasing video file", which is incorporated herein by reference in its entirety.

TECHNICAL FIELD

The present application relates to the field of video processing, and in particular to a method and an apparatus for releasing a video file.

BACKGROUND

In recent years, with the advent of various video playing applications and live video applications in people's lives, these applications have become an indispensable part of people entertainment leisure.

Generally, these applications have a video preview interface. In the video preview interface, a preview image of a video file is often displayed for users to watch and to select their favorite videos for watching or downloading. The preview image of a video file is typically a frame image generated by a back-end server of an application based on the content of the video file. Generally, a preview image is a frame image in a video file, or a frame image related to the content of the video file.

It can be seen that a preview image of a video file displayed in the video preview interface of an application is a still image. When viewing the preview image, a user gets very little information about the content of the video file, and thus user experience is not good.

SUMMARY

An objective of embodiments of the present application is to provide a method and an apparatus for releasing a video file, so as to enable a user to get more information related to the content of a video file and to improve user experience. Specifically, the technical solutions are as follows.

In the first aspect, an embodiment of the present application provides a method for releasing a video file, which is applied to a server. The method comprises:
  obtaining a video file to be released;
  selecting a first preset number of video frames in the video file to be released; generating a target video file using the selected video frames;
  determining a target display position for the target video file in a video preview interface;
  storing the correspondence between the target display position and the target video file, so that a first terminal logging in the server plays the target video file at the target display position in the video preview interface based on the correspondence.

Optionally, obtaining a video file to be released comprises:
  obtaining a video file to be released sent by a second terminal;
  selecting a first preset number of video frames in the video file to be released comprises:
  selecting the first preset number of video frames starting from the start position of the video file to be released or selecting the first preset number of video frames in the video file to be released according to a first preset rule.

Optionally, obtaining a video file to be released comprises:
  receiving a video file to be released and a target timestamp sent by a second terminal, wherein the target timestamp is a timestamp selected by a user, which is obtained and sent by the second terminal;
  selecting a first preset number of video frames in the video file to be released comprises:
  determining a target video frame corresponding to the target timestamp in the video file to be released;
  selecting the first preset number of video frames according to a second preset rule by taking the target video frame as the first video frame in the first preset number of video frames.

Optionally, generating a target video file using the selected video frames comprises:
  adding a second preset number of video frames at the end of the selected video frames, in reverse order, after the last video frame of the selected video frames to generate the target video file.

In the second aspect, an embodiment of the present application provides another method for releasing a video file, which is applied to a first terminal. The method comprises:
  logging in a server so that the server sends pre-stored correspondence between a target display position in a video preview interface and a target video file to the first terminal, wherein the target video file is a video file that is generated by the server using a first preset number of video frames, wherein the first preset number of video frames are selected by the server in an obtained video file to be released;
  receiving the correspondence, and playing the target video file at the target display position in the video preview interface based on the correspondence.

Optionally, the correspondence between the target display position in the video preview interface and the target video file is the correspondence between the target display position in the video preview interface and a storage address of the target video file;
  playing the target video file at the target display position in the video preview interface comprises:
  playing the target video file corresponding to the storage address contained in the correspondence at the target display position in the video preview interface.

Optionally, playing the target video file at the target display position in the video preview interface comprises:
  playing video frames of the target video file in positive order at the target display position in the video preview interface;
  after the last video frame of the target video file is played, playing the video frames of the target video file in reverse order till a preset video frame;
  returning to the playing video frames of the target video file in positive order, and stopping playing the target video file when a stop playing instruction is obtained.

Optionally, each of the video frames of the target video file contains a video frame identifier;
  playing the video frames of the target video file in reverse order till a preset video frame comprises:
  obtaining the last but one video frame of the target video file based on the video frame identifier contained in each of the video frames;

playing the video frames of the target video file in reverse order from the last but one video frame till the preset video frame.

Optionally, the preset video frame is the second video frame of the target video file.

In the third aspect, an embodiment of the present application provides another method for releasing a video file, which is applied to a second terminal. The method comprises:

obtaining a video file to be released;
sending the video file to be released to a server, so that the server receives the video file to be released, selects a first preset number of video frames in the video file to be released, generates a target video file using the selected video frames, and for an interface identifier of a video preview interface, creates the correspondence between a display position in the video preview interface and the target video file, wherein a first terminal plays the target video file at the display position of the video preview interface based on the correspondence between the display position in the video preview interface and the target video file.

Optionally, after obtaining a video file to be released, the method further comprises:

obtaining a target timestamp selected by a user;
sending the video file to be released to a server comprises:
sending the video file to be released and the target timestamp to the server, so that the server receives the video file to be released and the target timestamp, determines a target video frame corresponding to the target timestamp in the video file to be released, and selects a first preset number of video frames, wherein the target video frame is taken as the first video frame of the first preset number of video frames.

Optionally, obtaining a target timestamp selected by a user comprises:

displaying a progress bar for the video file to be released;
obtaining information of a position selected by the user on the progress bar;
determining the target timestamp selected by the user based on the information of the position, the length of the progress bar and the duration of the video file to be released.

Optionally, the progress bar is a progress bar in picture form.

In the fourth aspect, an embodiment of the present application provides an apparatus for releasing a video file, which is applied to a server. The apparatus comprises:

a video file obtainment module, used for obtaining a video file to be released;
a video frame selection module, used for selecting a first preset number of video frames in the video file to be released;
a target video file generating module, used for generating a target video file using the selected video frames;
a target display position determination module, used for determining a target display position for the target video file in a video preview interface;
a correspondence storing module, used for storing the correspondence between the target display position and the target video file, so that a first terminal logging in the server plays the target video file at the target display position in the video preview interface based on the correspondence.

Optionally, the video file obtainment module comprises:
a first video file obtainment unit, used for obtaining a video file to be released sent by a second terminal;

the video frame selection module comprises:
a first video frame selection unit, used for selecting the first preset number of video frames starting from the start position of the video file to be released or selecting the first preset number of video frames in the video file to be released according to a preset rule.

Optionally, the video file obtainment module comprises:
a second video file obtainment unit, used for receiving a video file to be released and a target timestamp sent by a second terminal, wherein the target timestamp is a timestamp selected by a user, which is obtained and sent by the second terminal;

the video frame selection module comprises:
a target video frame determination unit, used for determining a target video frame corresponding to the target timestamp in the video file to be released;
a second video frame selection unit, used for selecting the first preset number of video frames, wherein the target video frame is taken as the first video frame of the first preset number of video frames.

Optionally, the target video file generating module comprises:
a target video file generating unit, used for adding a second preset number of video frames at the end of the selected video frames, in reverse order, after the last video frame of the selected video frames to generate the target video file.

In the fifth aspect, an embodiment of the present application provides an apparatus for releasing a video file, which is applied to a first terminal. The apparatus comprises:

a login module, used for logging in a server so that the server sends pre-stored correspondence between a target display position in a video preview interface and a target video file to the first terminal, wherein the target video file is a video file that is generated by the server using a first preset number of video frames, wherein the first preset number video frames are selected by the server in an obtained video file to be released;
a target video file playing module, used for receiving the correspondence, and playing the target video file at the target display position in the video preview interface based on the correspondence.

Optionally, the correspondence between the target display position in the video preview interface and the target video file is the correspondence between the target display position in the video preview interface and a storage address of the target video file;

the target video file playing module comprises:
a target video file playing unit, used for playing the target video file corresponding to the storage address contained in the correspondence at the target display position in the video preview interface.

Optionally, the target video file playing module comprises:
a positive order playing unit, used for playing video frames of the target video file in positive order at the target display position in the video preview interface;
a reverse order playing unit, used for, after the last video frame of the target video file is played, playing the video frames of the target video file in reverse order till a preset video frame, and triggering the positive order playing unit;
a stop playing unit, used for stopping playing the target video file when obtaining a stop playing instruction.

Optionally, each of the video frames of the target video file contains a video frame identifier;
the reverse order playing unit comprises:

a video frame obtainment subunit, used for obtaining the last but one video frame of the target video file based on the video frame identifier contained in each of the video frames;

a reverse order playing subunit, used for playing the video frames of the target video file in reverse order from the last but one video frame till the preset video frame.

Optionally, the preset video frame is the second video frame of the target video file.

In the sixth aspect, an embodiment of the present application provides another apparatus for releasing a video file, which is applied to a second terminal. The apparatus comprises:

a video file to be released obtainment module, used for obtaining a video file to be released;

a video file to be released sending module, used for sending the video file to be released to a server, so that the server receives the video file to be released, selects a first preset number of video frames in the video file to be released, generates a target video file using the selected video frames, determines a target display position for the target video file in a video preview interface, and stores the correspondence between the target display position and the target video file so that a first terminal logging in the server plays the target video file at the target display position in the video preview interface based on the correspondence.

Optionally, the apparatus further comprises:

a target timestamp obtainment module, used for, after the video file to be released is obtained, obtaining a timestamp selected by a user;

the video file to be released sending module comprises:

a target timestamp sending module, used for sending the video file to be released and the target timestamp to the server, so that the server receives the video file to be released and the target timestamp, determines a target video frame corresponding to the target timestamp in the video file to be released, and selects a first preset number of video frames, wherein the target video frame is taken as the first video frame of the first preset number of video frames.

Optionally, the target timestamp obtainment module comprises:

a progress bar display module, used for displaying a progress bar for the video file to be released;

a position information obtainment module, used for obtaining information of a position selected by the user on the progress bar;

a target timestamp determination module, used for determining the target timestamp selected by the user based on the information of the position, the length of the progress bar and the duration of the video file to be released.

In addition, an embodiment of the present application provides a server comprising a processor, a communication interface, a memory and a communication bus, wherein the processor, the communication interface and the memory communicate with each other via the communication bus;

the memory is used for storing a computer program;

the processor is used for implementing the first method described above when executing the program stored on the memory.

In addition, an embodiment of the present application provides a computer readable storage medium storing a computer program thereon, wherein the computer program is executed by a processor to implement the first method described above.

In addition, an embodiment of the present application provides a terminal, wherein the terminal comprises a processor, a communication interface, a memory and a communication bus, wherein the processor, the communication interface and the memory communicate with each other via the communication bus;

the memory is used for storing a computer program;

the processor is used for implementing the second method described above when executing the program stored on the memory.

In addition, an embodiment of the present application provides another computer readable storage medium storing a computer program thereon, wherein the computer program is executed by a processor to implement the second method described above.

In addition, an embodiment of the present application provides another terminal, wherein the terminal comprises a processor, a communication interface, a memory and a communication bus, wherein the processor, the communication interface and the memory communicate with each other via the communication bus;

the memory is used for storing a computer program;

the processor is used for implementing the third method described above when executing the program stored on the memory.

In addition, an embodiment of the present application provides another computer readable storage medium storing a computer program thereon, wherein the computer program is executed by a processor to implement the third method described above.

In addition, an embodiment of the present application provides a first computer program product for performing the first method described above when being executed.

An embodiment of the present application provides a second computer program product for performing the second method described above when being executed.

An embodiment of the present application provides a third computer program product for performing the third method described above when being executed.

In the solution provided by the embodiments of the present application, the server obtains a video file to be released; selects a first preset number of video frames in the video file to be released; generates a target video file using the selected video frames; determines a target display position for the target video file in a video preview interface; and stores the correspondence between the target display position and the target video file so that a first terminal logging in the server plays the target video file at the target display position in the video preview interface based on the correspondence. As can be seen, since the first terminal plays the target video file at the target display position in the video preview interface, the user can get more information about the content of the video file to be released from the target video file, so that the user experience is improved.

BRIEF DESCRIPTION OF THE DRAWINGS

In order to explain the technical solutions of embodiments of the application or of the prior art more clearly, a simple introduction of the drawings required in the description of the embodiments and of the prior art will be given. Obviously, the drawings described below are just those of some embodiments of the application and other drawings can be obtained by those of ordinary skills in the art without any creative efforts based on these drawings.

DETAILED DESCRIPTION

The technical solutions of the application will be described clearly and completely, with reference to the drawings of embodiments of the application.

Obviously, the embodiments described are merely some of the embodiments of the application, instead of all the embodiments. All other embodiments obtained by those of ordinary skills in the art based on the embodiments herein without any creative efforts are within the scope of the application.

In order to enable the user to get more information related to the content of a video file when viewing a video preview interface of an application and to improve user experience, the embodiments of the present application provide a method, an apparatus, a server, a terminal, and a computer readable storage medium for releasing a video file.

A first method for releasing a video file provided by an embodiment of the present application will be described first.

It should be noted that the first method for releasing a video file provided by the embodiment of the present application is applied to a server. The server can be a back-end server of an application such as a video playing application, a live video application. In the embodiments of the present application, an interface for displaying a video file in these applications is referred to as a video preview interface.

Figure 1:
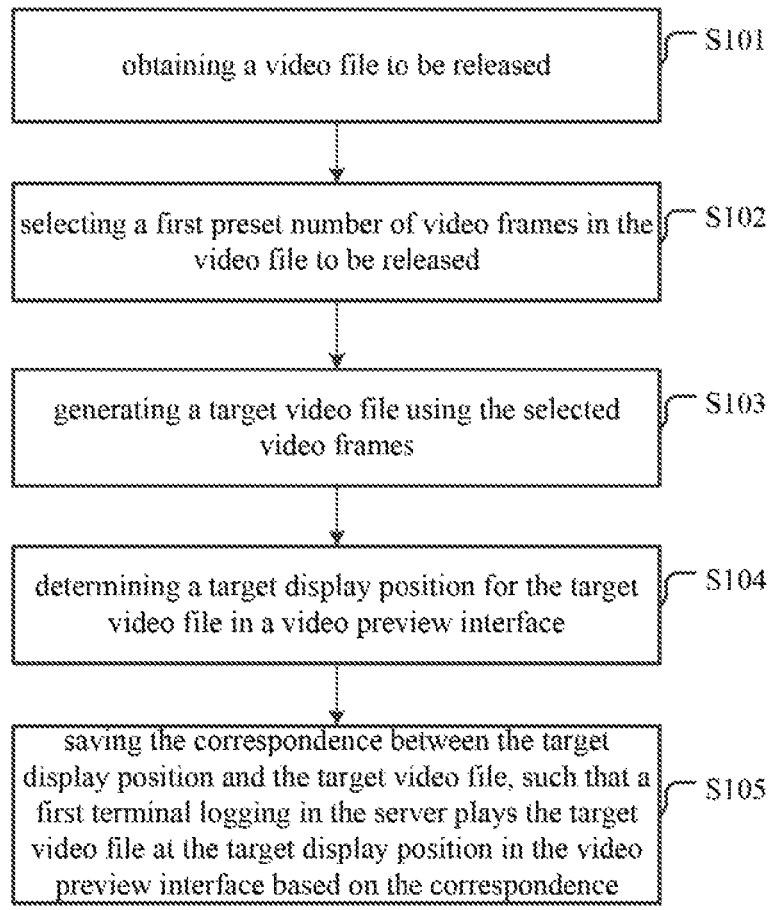
FIG. 1 is a flow chart of a first method for releasing a video file provided by an embodiment of the present application.

FIG. 1 shows a method for releasing a video file, applied to a server. The method comprises:

S101, obtaining a video file to be released.

It can be understood that the video file to be released is generally a video file stored in the server which needs to be released to the video preview interface. The video file to be released can be a video file downloaded from the Internet. Furthermore, the video file to be released can be a video file sent by a terminal that has established a communication connection with the server. These are reasonable.

S102, selecting a first preset number of video frames in the video file to be released.

After obtaining the video file to be released, the server can select a preset number of video frames in the video file to be released. The server can parse the video file to be released to obtain video frames contained in the video file to be released, and then select the first preset number of video frames therein.

Specifically, the video frames can be selected according to a preset rule, for example, selecting the middle five video frames in the video file to be released, or selecting the last six video frames in the video file to be released, which is reasonable. This is not specifically limited herein.

In an implementation, the server can select the first preset number of video frames starting from the first frame of the video file to be released, that is, select the first preset number of video frames from the start of the video file to be released.

It should be noted that the first preset number can be determined based on factors such as the number of video frames contained in the video file to be released and the size of a target video file to be generated. For example, the first preset number can be 5, 7, 9, or the like, which is not limited herein. The way for parsing the video file to be released can be any video parsing way in the related video parsing technology as long as it can parse the video file to be released and thus obtain video frames of the video file to be released, which is not specifically limited herein.

S103, generating a target video file using the selected video frames.

After selecting the first preset number of video frames, the server can generate a target video file using the first preset number of video frames. It can be understood that since the first preset number of video frames are selected in the video file to be released, the first preset number is generally less than the total number of video frames contained in the video file to be released. Therefore, the target video file can be considered as a small video file corresponding to the video file to be released, which contains a part of content of the video file to be released.

It should be noted that in an implementation, the target file can be a video file in webp format, which can store storage space of the server.

S104, determining a target display position for the target video file in a video preview interface.

After generating the target video file, the server can determine the target display position for the target video file in the video preview interface. In an implementation, the video preview interface can include a plurality of video display areas, and can display a plurality of video files at the same time, and the display can be in a chronological order or depending on keyword popularity or other factors. After the target video file is generated, the server can determine, based on those factors, the display position for the target video file in the video preview interface, i.e. the target display position.

If the video preview interface comprises only one display area for a video file, the server can determine that the display area is the target display position for the target video file.

S105, storing the correspondence between the target display position and the target video file, so that a first terminal logging in the server plays the target video file at the target display position in the video preview interface based on the correspondence.

After determining the target display position for the target video file, the server can store correspondence between the target display position and the target video file, so that a first terminal logging in the server later can play the target video file at the target display position in the video preview interface of the first terminal based on the correspondence.

In order to store the above correspondence conveniently, the target display position can be indicated by its identifier in the video preview interface and the like. For example, if the display area for the video file in the video preview interface is a rectangular area, the correspondence between coordinates of four vertices of the rectangular area and the target video file can be stored, which is reasonable.

As can be seen, in the solution provided by the embodiment of the present application, the server obtains a video file to be released; selects a first preset number of video frames in the video file to be released; generates a target video file using the selected video frames; determines a target display position for the target video file in a video preview interface; and stores the correspondence between the target display position and the target video file so that a first terminal logging in the server plays the target video file at the target display position in the video preview interface based on the correspondence. Since the first terminal plays the target video file at the target display position in the video preview interface, the user can get more information about the content of the video file to be released from the target video file, so that the user experience is improved.

As an implementation of the embodiment of the present application, obtaining a video file to be released can comprise:

obtaining a video file to be released sent by a second terminal.

In this implementation, the video file to be released can be sent by a second terminal which has established a communication connection with the server. The video file to be released can be a video file recorded by a user via a camera of the second terminal and sent to the server. The video file to be released can also be a video file obtained by the second terminal via other ways and sent to the server, for example, a video file downloaded from the Internet.

Accordingly, selecting a first preset number of video frames in the video file to be released described above can comprise:

selecting the first preset number of video frames from the start position of the video file to be released or selecting the first preset number of video frames in the video file to be released according to a first preset rule.

In an implementation, the server can select the first preset number of video frames from the start position of the video file to be released, that is, select the first preset number of video frames, including the first video frame, starting from the first video frame of the video file to be released. For example, if the first preset number is 8, the server can select the first to the eighth video frames starting from the first video frame of the video ile to be released.

In another implementation, the server can select the first preset number of video frames in the video file to be released according to the first preset rule. For example, the first preset rule is to select the last five video frames in the video file to be released. The server can select five video frames at the end of the video file to be released, that is, select the last but four to the last video frames.

As an implementation of the embodiment of the present application, obtaining a video file to be released can comprise:

receiving a video file to be released and a target timestamp sent by the second terminal.

The second terminal can send the target timestamp to the server while sending the video file to be released to the server. When receiving the video file to be released sent by the second terminal, the server will receive the target timestamp.

The target timestamp is a timestamp selected by a user, which is obtained and sent by the second terminal. That is, the second terminal can provide a user selection entry for the user to select a target timestamp for the video file to be released. For example, the second terminal can provide a timestamp selection interface on which the user can select a target timestamp.

Accordingly, selecting a first preset number of video frames in the video file to be released described above can comprise:

determining a target video frame corresponding to the target timestamp in the video file to be released; and selecting the first preset number of video frames according to a second preset rule, by taking the target video frame as the first video frame.

After obtaining the target timestamp, the server can determine a target video frame corresponding to the target timestamp in the video file to be released. In particular, since the video frames of the video file generally contain timestamps, it can be understood that the timestamps indicate the chronological order of the video frames. That way, the server can parse the video file to be released to obtain the timestamp of each of the video frames in the video file to be released, and then determine a video frame with a same timestamp as the target timestamp as the target video frame.

Further, the server can select the first preset number of video frames according to the second preset rule by taking the target video frame as the first video frame. The second preset rule can be that the video frames are sequentially selected in the order of arrangement thereof. For example, if the first preset number is 6 and the target video frame is the 15th video frame, the server selects the 15th to the 21th video frames in the video file to be released.

As can be seen, in this embodiment, the server can generate a target video file based on the target timestamp selected by the user, so as to satisfy the user's needs and improve user experience.

As an implementation of the embodiment of the present application, generating a target video file using the selected video frames can comprise: adding a second preset number of video frames at the end of the selected video frames, in reverse order, after the last video frame of the selected video frames to generate the target video file.

After selecting the first preset number of video frames, the server can add the second preset number of video frames, which are located at the end of the selected preset number of video frames, in reverse order after the last video frame of the selected video frames, to generate the target video file. It can be understood that the reverse order is an order that is opposite to the order of the video frames in the target video file. The second preset number can be set based on the number of the selected video frames, which is not limited herein. For example, the second preset number can be 2, 3, 4, or the like. It can be understood that the second preset number is not greater than the first preset number.

For example, the second preset number is 3. The server adds the last but one to the last but three video frames in the obtained first preset number of video frames, in reverse order, after the last video frame of the obtained first preset number of video frames, to generate the target video file. The reverse order here means the order: the last but one video frame, the last but two frame, and the last but three frame.

That is, if the obtained first preset number of video frames contain 6 video frames, the last but one to the last but three video frames are the third to the fifth video frames. The generated target video file thus contains the first preset number of video frames (from the first to the sixth video frames) and, after the sixth video frame, further contains the fifth, the fourth and the third video frames. That is, the generated target video file contains 9 video frames in total. The order of the video frames in the target video file is: the first to the sixth video frames, the fifth video frame, the fourth video frame and the third video frame.

In one case, the second preset number can be 2 less than the first preset number. That is, the server will add the second to the last but one video frames in the selected preset number of video frames, in reverse order, after the last video frame of the selected video frames. That way, the generated target video file contains the first to the last video frames and further contains, after the last video frame, the second to the last but one video frames in reverse order.

As can be seen, in this embodiment, since there are slight difference between the content of the first video frame and that of the last video frame of the target video file, when the target video file is played in a loop on a video preview interface, the user will not feel much flicker and thus has a better experience.

An embodiment of the present application provides a second method for releasing a video file. The second method for releasing a video file provided by the embodiment of the present application will be described below.

First, it should be noted that the second method for releasing a video file provided in the embodiment of the present application is applied to a first terminal which has established a communication connection with a server. The first terminal can be an electronic device such as a mobile phone, a computer, a tablet computer or the like, which is not limited herein.

Figure 2:
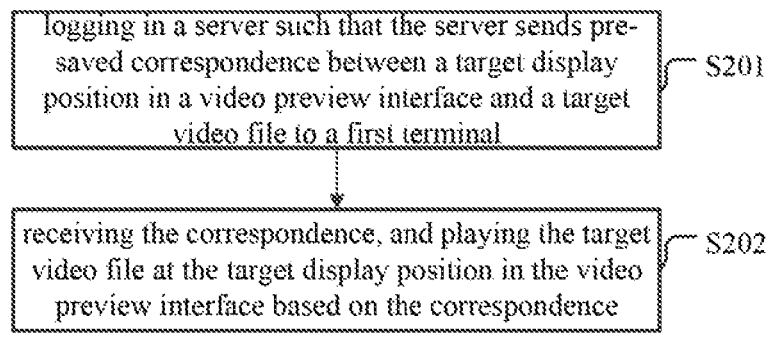
FIG. 2 is a flow chart of a second method for releasing a video file provided by an embodiment of the present application.

FIG. 2 shows a method for releasing a video file, applied to a first terminal.

The method comprises S201-S202.

S201, logging in a server so that the server sends pre-stored correspondence between a target display position in a video preview interface and a target video file to the first terminal.

When a user starts a video preview interface of an application installed in the first terminal, the first terminal logs in the server. The specific implementation of logging in a server can be any login way in related art. For example, the first terminal can display a user name input column and a password input column, so that the user can input a user name and password to log in.

In order to enable the server to know that the interface started by the user is the video preview interface, the first terminal can send an interface identifier to the server while logging in the server. The server can then send pre-stored correspondence between a target display position in the video preview interface and the target video file to the first terminal. It can be understood that the interface identifier is an interface identifier of the video preview interface. After receiving the interface identifier, the server can send the correspondence to the first terminal.

The target video file is a video file that is generated by the server using a first preset number of video frames, wherein the first preset number are selected by the server in the obtained video file to be released. The way for generating a target video file and the way for creating the correspondence have been described in detail in the embodiment of the first method, which are not specifically limited herein.

S202, receiving the correspondence, and playing the target video file at the target display position in the video preview interface based on the correspondence.

After receiving the correspondence, the first terminal can play the target video file at the target display position in the video preview interface based on the correspondence. In an implementation, the video preview interface can comprise a plurality of video display areas and display a plurality of video files at the same time. In addition, the video preview interface can comprise only one display area for a video file. Regardless of the number of video display areas in the video preview interface, the first terminal can determine the target display position for the target video file in the video preview interface as long as the first terminal obtains the correspondence, and then play the target video file at the target display position.

For example, the target display position for the correspondence described above is the coordinates of four vertices of a rectangle. After obtaining the correspondence, the first terminal can obtain the coordinates of the four vertices, determine positions in the video preview interface for the coordinates of the four vertices, i.e. obtain positions of four points, determine the rectangle formed based on the four points as the actual target display position, and then play the target video file in the rectangular area in the video preview interface.

For another example, if the size of each of the video display areas is preset, the target display position for the correspondence sent by the server can be the coordinates of the center point for the video display area. After obtaining the correspondence, the first terminal can determine the actual target display position for the target video file in the video preview interface as the area, with the preset size, centered on the coordinates of the center point, and then play the target video file at the area.

In an implementation, the correspondence between the target display position and the target video file can be the correspondence between the target display position in the video preview interface and a storage address of the target video file. The storage address is an address at which the server stores the target video file. When playing the target video file, the first terminal can load the target video file based on the storage address, and then play the target video file at the target display position in the video preview interface.

As can be seen, in the solution provided by the embodiment of the present application, the first terminal logs in a server so that the server sends pre-stored correspondence between a target display position in a video preview interface and a target video file to the first terminal; receives the correspondence; and plays the target video file at the target display position in the video preview interface based on the correspondence. Since the first terminal plays the target video file at the target display position in the video preview interface, the user can get more information about the content of the video file to be released from the target video file, so that the user experience is improved.

Figure 3:
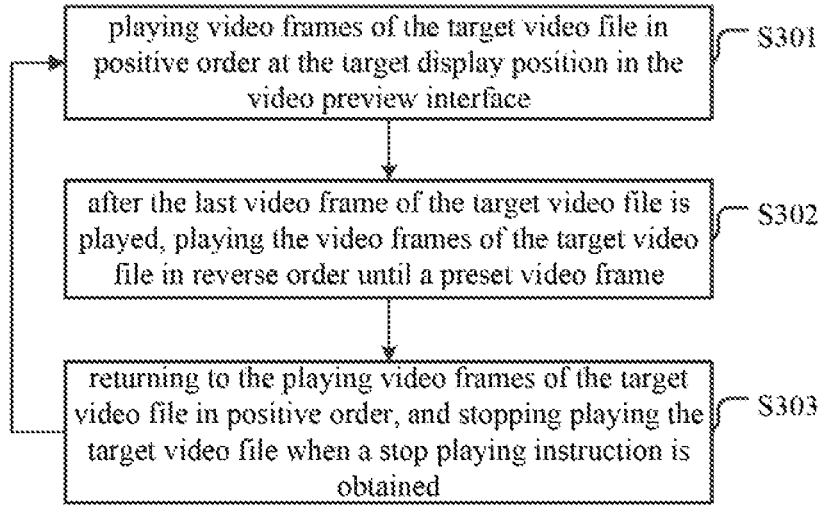
FIG. 3 is a specific flow chart of a way of playing a target video file in the embodiment shown in FIG. 2.

As an implementation of the embodiment of the present application, as shown in FIG. 3, playing the target video file at the target display position in the video preview interface can comprise S301-S303.

S301, playing video frames of the target video file in positive order at the target display position in the video preview interface.

It can be understood that playing video frames in positive order means playing the first video frame and then the second video frame till the last video frame of the target video file. For example, if the target video frames comprise 6 video frames, playing video frames in positive order means playing the first video frame and then the second video frame till the last video frame (i.e. the sixth video frame) of the target video file. The way of playing video frames can be any video playing way in related art. For example, each of the video frames is determined based on information such as a video frame identifier, and then the video frames are played. This is not specifically limited herein.

S302, after the last video frame of the target video file is played, playing the video frames of the target video file in reverse order till a preset video frame.

After the last video frame of the target video file is played, the first terminal can play the video frames of the target video file in reverse order till the preset video frame. It can be understood that playing the video frames in reverse order means playing the video frames in an order that is opposite to the positive order.

The preset video frame can be set based on factors such as the number of video frames contained in the target video file, which is not specifically limited herein. For example, if the target video file contains 6 video frames, the preset video frame can be the third video frame, the last but one video frame, or the like.

S303, returning to the playing video frames of the target video file in positive order, and stopping playing the target video file when a stop playing instruction is obtained.

After playing the video frames of the target video file in reverse order till the first preset video frame, the first terminal can return to the playing video frames of the target video file in positive order described above, and thus performing loop playback. That is, after the preset video frame is played, the target video file will be played in positive order again from the first video frame of the target video file.

When obtaining a stop playing instruction, the second terminal can stop playing the target video file. For example, in one case, the second terminal obtains a stop playing instruction when the user clicks the target video file played in the target display position in the video preview interface, stops playing the target video file, and then enters a video playing interface to play a complete video file corresponding to the target video file, i.e. the video file to be released.

As can be seen, when the way described above is used to play the target video file, the target video file is played in positive order and then the target video file is played in reverse order till the preset video frame. Therefore, since the content of the target video file has a small leap in content, the flickering feeling brought to the user during playing of the target video file can be reduced, and user experience can be improved.

For the case where each of the video frames of the target video file contains a video frame identifier, in an implementation of the embodiment of the present application, playing the video frames of the target video file in reverse order till a preset video frame can comprise:

obtaining the last but one video frame of the target video file based on the video frame identifier contained in each of the video frames; and playing the video frames of the target video file in reverse order from the last but one video frame till the preset video frame.

The video frame identifier can be a frame number, a timestamp, an offset of the video frame and the like, which is not specifically limited herein, as long as the order of the video frames can be identified.

That way, after the last video frame of the target video file is played, the first terminal can obtain the last but one video frame of the target video file based on the video frame identifier contained in each of the video frames, and then play the video frames of the target video file in reverse order from the last but one video frame till the first preset video frame.

For example, the video frame identifier is the frame number, the target video file comprises 9 video frames, and the frame numbers of the first video frame to the last video frame are 1 to 9. After the last video frame of the target video file is played, the first terminal can obtain the last but one video frame with the frame number 8 of the video file, based on the frame number of each of the video frames, and then play the video frames of the target video file in reverse order from the last but one video frame with the frame number 8 till the first preset video frame.

As an implementation of the embodiment of the present application, the preset video frame described above is the second video frame of the target video file. That is, after the last video frame of the target video file is played, the first terminal plays the video frames of the target video file in reverse order till the second video frame, and then plays the video frames of the target video file in positive order from the first video frame of the target video file again. That way, since the second video frame and the first video frame of the target video file are consecutive video frames, there is a smaller difference between the video contents thereof. Thus, the flicker the user feels when watching the target video file can be further reduced and user experience further improved.

An embodiment of the present application provides a third method for releasing a video file. The third method for releasing a video file provided by the embodiment of the present application will be described below.

First, it should be noted that the third method for releasing a video file provided in the embodiment of the present application is applied to a second terminal which has established a communication connection with a server. The second terminal can be an electronic device such as a mobile phone, a computer, a tablet computer or the like, which is not limited herein. In particular, it should be noted that the second terminal and the first terminal can be a same terminal, or can be different terminals. These are reasonable.

Figure 4:
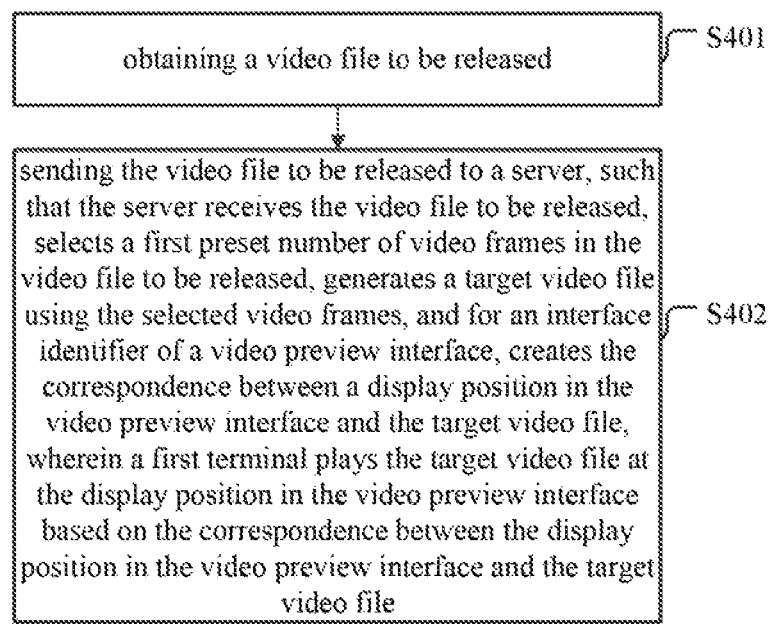
FIG. 4 is a flow chart of a third method for releasing a video file provided by an embodiment of the present application.

FIG. 4 shows a method for releasing a video file, applied to a second terminal. The method comprises S401-S402.

S401, obtaining a video file to be released.

It can be understood that the video file to be released is generally a video file stored in the second terminal. In a case where the second terminal has a camera, the video file to be released can be a video file taken by a user by the camera of the second terminal. Of course, the video file to be released can be a video file downloaded from the Internet by a user. Further, the video file to be released can be a video file sent by other devices which have established a communication connection with the second terminal. These are reasonable.

S402, sending the video file to be released to a server, so that the server receives the video file to be released, selects a first preset number of video frames in the video file to be released, generates a target video file using the selected video frames, and for an interface identifier of a video preview interface, creates the correspondence between a display position in the video preview interface and the target video file, wherein a first terminal plays the target video file at the display position in the video preview interface based on the correspondence between the display position in the video preview interface and the target video file.

After obtaining the video file to be released, the second terminal can send the video file to be released to the server.

Then, the server selects a first preset number of video frames in the video file to be released, generates a target video file using the selected video frames, and for an interface identifier of a video preview interface, creates the correspondence between a display position in the video preview interface and the target video file. That way, after logging in the server, the first terminal can obtain the correspondence, stored in the server, between the display position in the video preview interface and the target video file, and then play the target video file at the corresponding display position in the video preview interface based on the correspondence.

It should be noted that, the second terminal and the first terminal can be the same terminal. That is, the second terminal can also log in the server and play the target video file at the corresponding display position in the video preview interface based on the correspondence described above.

The specific processes of generating the target video file and creating the correspondence described above by the server and of playing the target video file by the first terminal have been described in detail in the embodiments of the two methods described above, which will not be described herein again.

As can be seen, in the solution provided by the embodiment of the present application, the second terminal obtains a video file to be released and sends the video file to be released to a server, so that the server receives the video file to be released, selects a first preset number of video frames in the video file to be released, generates a target video file using the selected video frames, and for an interface identifier of a video preview interface, creates the correspondence between a display position in the video preview interface and the target video file, wherein a first terminal plays the target video file at the corresponding display position in the video preview interface based on the correspondence between the display position in the video preview interface and the target video file. Since the first terminal plays the target video file at the target display position in the video preview interface, the user can get more information about the content of the video file to be released from the target video file, and user experience is improved.

Moreover, the user can select a video files to be released that he/she wants to release via the second terminal, and thus the user experience is further improved.

In order to enable a user to select video frames contained in a target video file according to his/her needs and improve user experience, in an implementation of the embodiment of the present application, after obtaining a video file to be released, the method described above can further comprise obtaining a target timestamp selected by a user.

The second terminal can provide a user selection entry for the user to select a timestamp for the video file to be released. For example, the second terminal can provide a timestamp selection interface on which the user can select a target timestamp.

Accordingly, sending the video file to be released to a server can comprise:

sending the video file to be released and the target timestamp to the server, so that the server receives the video file to be released and the target timestamp, determines a target video frame corresponding to the target timestamp in the video file to be released, and selects a first preset number of video frames, wherein the target video frame is taken as the first video frame of the first preset number of video frames.

The second terminal can send the target timestamp to the server while sending the video file to be released to the server. When receiving the video file to be released sent by the second terminal, the server will receive the target timestamp. As such, the server can determine the target video frame corresponding to the target timestamp from the video file to be released.

In particular, since the video frames of the video file generally contain timestamps, it can be understood that the timestamps identify the chronological order of the video frames. That way, the server can parse the video file to be released to obtain the timestamp of each of the video frames in the video file to be released, and then determine a video frame with a same timestamp as the target timestamp as the target video frame. Further, the server can select a first preset number of video frames, wherein the target video frame is taken as the first video frame of the first preset number of video frames. The first preset number can be set based on the number of video frames contained in the video file to be released, which is not limited herein. For example, the first preset number can be 5, 6, 9, or the like.

For the case where the second terminal sends the target timestamp to the server while sending the video file to be released to the server, in an implementation of the embodiment of the present application, obtaining a target timestamp selected by a user can comprise:

displaying a progress bar for the video file to be released; obtaining information of a position selected by the user on the progress bar; determining the target timestamp selected by the user based on the information of the position, the length of the progress bar and the duration of the video file to be released.

Specifically, the second terminal can display a progress bar for the video file to be released on a preset interface. It can be understood that the progress bar is used to indicate the length of the video file to be released. In an embodiment, the progress bar can be a progress bar in picture form. These pictures can be some of pictures in the video file to be released, so that a user can see the rough content of the video file to be released more intuitively, which makes it easy for the user to select a target timestamp.

The user can select a position he/she wants on the progress bar of the video file to be released displayed in the preset interface. For example, the user can click on a position on the progress bar to select the position. The second terminal can obtain the information of the position selected by the user on the progress bar.

The second terminal can then determine the target timestamp selected by the user based on the information of the position selected by the user on the progress bar, the length of the progress bar and the duration of the video file to be released. Specifically, the length of the progress bar indicates the duration of the video. The ratio of the length between the start position of the progress bar and the position selected by the user to the length of the progress bar is equal to the ratio of the duration corresponding to the timestamp selected by the user to the duration of the video file to be released. The start time of the video file to be released is determined, thus the target timestamp can be determined.

For example, the length of the progress bar is 6 cm, the distance between the position selected by the user and the start position of the progress bar is 3 cm, and the duration of the video file to be released is 100 s. In this case, the duration corresponding to the timestamp selected by the user is 100*(3/6)=50 s, and if the start time of the video file to be released is three p.m., Jul. 29, 2017, the target timestamp is a timestamp corresponding to 50 seconds past three p.m., Jul. 29, 2017.

As can be seen, in this embodiment, the user can select a target timestamp, and the second terminal can display a progress bar in picture form, so that the user can see the content of the video file to be released more intuitively, which makes it easy for the user to select a target timestamp and thus improves user experience.

For the embodiment of the first method described above, an embodiment of the present application provides an apparatus for releasing a video.

A first apparatus for releasing a video file provided by an embodiment of the present application will be described below.

Figure 5:
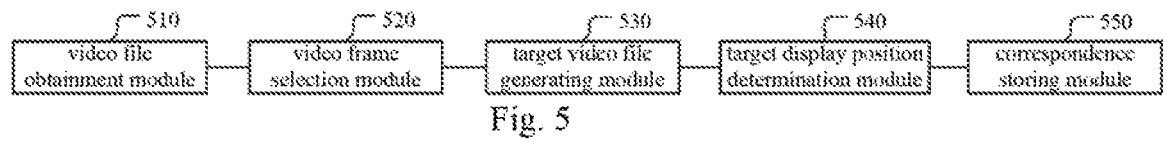
FIG. 5 is a schematic diagram of the structure of a first apparatus for releasing a video file provided by an embodiment of the present application.

FIG. 5 shows an apparatus for releasing a video file, applied to a server. The apparatus comprises:
- a video file obtainment module 510, used for obtaining a video file to be released;
- a video frame selection module 520, used for selecting a first preset number of video frames in the video file to be released;
- a target video file generating module 530, used for generating a target video file using the selected video frames;
- a target display position determination module 540, used for determining a target display position for the target video file in a video preview interface;
- a correspondence storing module 550, used for storing correspondence between the target display position and the target video file, so that a first terminal logging in the server plays the target video file at the target display position in the video preview interface based on the correspondence.

As can be seen, in the solution provided by the embodiment of the present application, the server obtains a video file to be released; selects a first preset number of video frames in the video file to be released; generates a target video file using the selected video frames; determines a target display position for the target video file in a video preview interface; and stores correspondence between the target display position and the target video file so that a first terminal logging in the server plays the target video file at the target display position in the video preview interface based on the correspondence. Since the first terminal plays the target video file at the target display position in the video preview interface, the user can get more information about the content of the video file to be released from the target video file, so that the user experience is improved.

As an implementation of the embodiment of the present application, the video file obtainment module 510 can comprise:
- a first video file obtainment unit (not shown in the figure), used for obtaining a video file to be released sent by a second terminal.

The video frame selection module 520 can comprise:
- a first video frame selection unit (not shown in the figure), used for selecting the first preset number of video frames starting from the start position of the video file to be released or selecting the first preset number of video frames in the video file according to a first preset rule.

As an implementation of the embodiment of the present application, the video file obtainment module 510 can comprise:
- a second video file obtainment unit (not shown in the figure), used for receiving a video file to be released and a target timestamp sent by the second terminal, wherein the target timestamp is a timestamp selected by a user, which is obtained and sent by the second terminal.

The video fame selection module 520 can comprise:
- a target video frame determination unit (not shown in the figure), used for determining a target video frame corresponding to the target timestamp in the video file to be released;
- a second video frame selection unit (not shown in the figure), used for selecting the first preset number of video frames according to a second preset rule by taking the target video frame as the first video frame.

As an implementation of the embodiment of the present application, the target video file generating module 530 can comprise:
- a target video file generating unit (not shown in the figure), used for adding a second preset number of video frames at the end of the selected video frames, in reverse order, after the last video frame of the selected video frames to generate the target video file.

For the embodiment of the second method described above, an embodiment of the present application provides an apparatus for releasing a video.

A second apparatus for releasing a video file provided by an embodiment of the present application will be described below.

Figure 6:
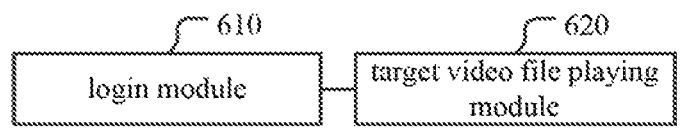
FIG. 6 is a schematic diagram of the structure of a second apparatus for releasing a video file provided by an embodiment of the present application.

FIG. 6 shows an apparatus for releasing a video file, applied to a first terminal. The apparatus comprises:
- a login module 610, used for logging in the server, so that the server sends pre-stored correspondence between a target display position in a video preview interface and a target video file to the first terminal;
- wherein the target video file is a video file that is generated by the server using a first preset number of video frames, wherein the first preset number of video frames are selected by the server in an obtained video file to be released;
- a target video file playing module 620, used for receiving the correspondence, and playing the target video file at the target display position in the video preview interface based on the correspondence.

As can be seen, in the solution provided by the embodiment of the present application, the first terminal logs in a server so that the server sends pre-stored correspondence between a target display position in a video preview interface and a target video file to the first terminal; receives the correspondence, and plays the target video file at the target display position in the video preview interface based on the correspondence. Since the first terminal plays the target video file at the target display position in the video preview interface, the user can get more information about the content of the video file to be released from the target video file, so that the user experience is improved.

As an implementation of the embodiment of the present application, the correspondence between the target display position in the video preview interface and the target video file is the correspondence between the target display position in the video preview interface and a storage address of the target video file.

The target video file playing module 620 can comprise:
- a target video file playing unit (not shown in FIG. 6), used for playing the target video file corresponding to the storage address contained in the correspondence at the target display position in the video preview interface.

As an implementation of the embodiment of the present application, the target video file playing module 620 can comprise:

a positive order playing unit (not shown in FIG. 6), used for playing video frames of the target video file in positive order at the target display position in the video preview interface;

a reverse order playing unit (not shown in FIG. 6), used for, after the last video frame of the target video file is played, playing the video frames of the target video file in reverse order till a preset video frame, and triggering the positive order playing unit;

a stop playing unit (not shown in FIG. 6), used for stopping playing the target video file when obtaining a stop playing instruction.

As an implementation of the embodiment of the present application, each of the video frames of the target video file contains a video frame identifier.

The reverse order playing unit can comprise:

a video frame obtainment subunit (not shown in FIG. 6), used for obtaining the last but one video frame of the target video file based on the video frame identifier contained in each of the video frames;

a reverse order playing subunit (not shown in FIG. 6), used for playing the video frames of the target video file in reverse order from the last but one video frame till the preset video frame.

As an implementation of the embodiment of the present application, the preset video frame is the second video frame of the target video file.

For the embodiment of the third method described above, an embodiment of the present application provides an apparatus for releasing a video.

A third apparatus for releasing a video file provided by an embodiment of the present application will be described below.

Figure 7:
FIG. 7 is a schematic diagram of the structure of a third apparatus for releasing a video file provided by an embodiment of the present application.

FIG. 7 shows an apparatus for releasing a video file, applied to a second terminal. The apparatus comprises:

a video file to be released obtainment module 710, used for obtaining a video file to be released;

a video file to be released sending module 720, used for sending the video file to be released to a server, so that the server receives the video file to be released, selects a first preset number of video frames in the video file to be released, generates a target video file using the selected video frames, determines a target display position for the target video file in a video preview interface; and stores the correspondence between the target display position and the target video file so that a first terminal logging in the server plays the target video file at the target display position in the video preview interface based on the correspondence.

As can be seen, in the solution provided by the embodiment of the present application, the second terminal obtains a video file to be released and sends the video file to be released to a server, so that the server receives the video file to be released, selects a first preset number of video frames in the video file to be released, generates a target video file using the selected video frames, and for an interface identifier of a video preview interface, creates the correspondence between a display position in the video preview interface and the target video file, wherein a first terminal plays the target video file at the corresponding display position in the video preview interface based on the correspondence between the display position in the video preview interface and the target video file. Since the first terminal plays the target video file at the target display position in the video preview interface, the user can get more information about the content of the video file to be released from the target video file, so that the user experience is improved.

Moreover, the user can select a video file to be released that he/she wants to release via the second terminal, so that the user experience is further improved.

As an implementation of the embodiment of the present application, the apparatus can further comprise:

a target timestamp obtainment module (not shown in FIG. 7), used for obtaining a timestamp selected by a user after a video file to be released is obtained.

The video file to be released sending module 720 can comprise:

a target timestamp sending module (not shown in FIG. 7), used for sending the video file to be released and the target timestamp to the server, so that the server receives the video file to be released and the target timestamp, determines a target video frame corresponding to the target timestamp in the video file to be released, and selects a first preset number of video frames, wherein the target video frame is taken as the first video frame of the first preset number of video frames.

As an implementation of the embodiment of the present application, the target timestamp obtainment module can comprise:

a progress bar display module (not shown in FIG. 7), used for displaying a progress bar for the video file to be released;

a position information obtainment module (not shown in FIG. 7), used for obtaining information of a position selected by the user on the progress bar;

a target timestamp determination module (not shown in FIG. 7), used for determining a target timestamp selected by the user based on the information of the position, the length of the progress bar and the duration of the video file to be released.

Figure 8:
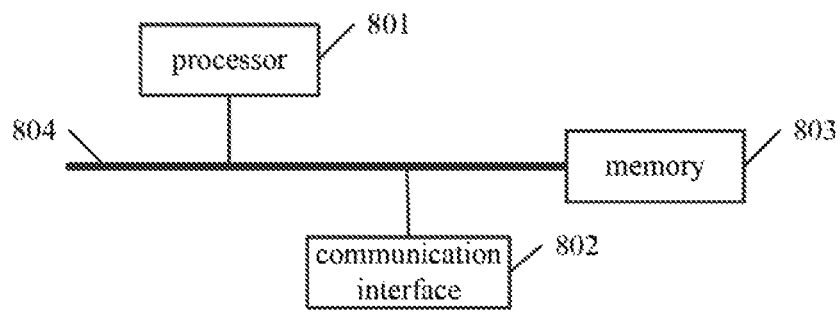
FIG. 8 is a schematic diagram of the structure of a server provided by an embodiment of the present application.

An embodiment of the present application provides a server, as shown in FIG. 8, which comprises a processor 801, a communication interface 802, a memory 803 and a communication bus 804, wherein the processor 801, the communication interface 802 and the memory 803 communicate with each other via the communication bus 804, the memory 803 is used for storing a computer program;

the processor 801 is used for performing the following process when executing the program stored on the memory 803:

obtaining a video file to be released;

selecting a first preset number of video frames in the video file to be released; generating a target video file using the selected video frames;

determining a target display position for the target video file in a video preview interface;

storing the correspondence between the target display position and the target video file, so that a first terminal logging in the server plays the target video file at the target display position in the video preview interface based on the correspondence.

As can be seen, in the solution provided by the embodiment of the present application, the server obtains a video file to be released; selects a first preset number of video frames in the video file to be released; generates a target video file using the selected video frames; determines a target display position for the target video file in a video preview interface; and stores the correspondence between the target display position and the target video file so that a first terminal logging in the server plays the target video file at the target display position in the video preview interface based on the correspondence. Since the first terminal plays the target video file at the target display position in the video preview interface, the user can get more information about the content of the video file to be released from the target video file, so that the user experience is improved.

The communication bus described with respect to the server above can be a peripheral component interconnect (PCI) bus, an extended industry standard architecture (EISA) bus, or the like. The communication bus can include an address bus, a data bus, a control bus, and the like. For representation, only one thick line is shown in the figure, which does not mean there is only one communication bus or one type of communication bus.

The communication interface is used for communication between the server described above and other devices.

The memory can include a random access memory (RAM). Furthermore, the memory can include a non-volatile memory (NVM), for example at least one disk memory. Optionally, the memory can also be at least one storage device located away from the processor described above.

The processor described above can be a general-purpose processor, including a central processing unit (CPU), a network processor (NP), and the like. The processor can also be a digital signal processor (DSP), an application specific integrated circuit (ASIC), a field-programmable gate array (FPGA) or other programmable logic device, a discrete gate or transistor logic device, a discrete hardware component.

Obtaining a video file to be released can comprise:
obtaining a video file to be released sent by a second terminal.

Selecting a first preset number of video frames in the video file to be released comprises:
selecting the first preset number of video frames starting from the start position of the video file to be released or selecting the first preset number of video frames in the video file to be released according to a preset rule.

Obtaining a video file to be released can comprise:
receiving a video file to be released and a target timestamp sent by the second terminal, wherein the target timestamp is a timestamp selected by a user, which is obtained and sent by the second terminal.

Selecting a first preset number of video frames in the video file to be released comprises:
determining a target video frame corresponding to the target timestamp in the video file to be released;
selecting the first preset number of video frames, wherein the target video frame is taken as the first video frame of the first preset number of video frames.

Generating a target video file using the selected video frames can comprise:
adding a second preset number of video frames at the end of the selected video frames, in reverse order, after the last video frame of the selected video frames to generate the target video file.

Figure 9:
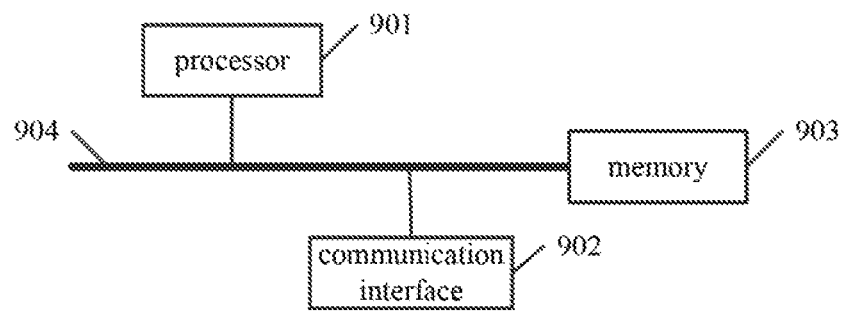
FIG. 9 is a schematic diagram of the structure of a terminal provided by an embodiment of the present application.

An embodiment of the present application provides a terminal, as shown in FIG. 9, which comprises a processor 901, a communication interface 902, a memory 903 and a communication bus 904, wherein the processor 901, the communication interface 902 and the memory 903 communicate with each other via the communication bus 904,
the memory 903 is used for storing a computer program;
the processor 901 is used for performing the following process when executing the program stored on the memory 903:
logging in a server so that the server sends pre-stored correspondence between a target display position in a video preview interface and a target video file to the first terminal; wherein the target video file is a video file that is generated by the server using a first preset number of video frames, wherein the first preset number of video frames are selected by server in an obtained video file to be released;
receiving the correspondence, and playing the target video file at the target display position in the video preview interface based on the correspondence.

As can be seen, in the solution provided by the embodiment of the present application, the first terminal logs in a server so that the server sends pre-stored correspondence between a target display position in a video preview interface and a target video file to the first terminal; receives the correspondence and plays the target video file at the target display position in the video preview interface based on the correspondence. Since the first terminal plays the target video file at the target display position in the video preview interface, the user can get more information about the content of the video file to be released from the target video file, so that the user experience is improved.

The communication bus described with respect to the terminal above can be a peripheral component interconnect (PCI) bus, an extended industry standard architecture (EISA) bus, or the like. The communication bus can include an address bus, a data bus, a control bus, and the like. For representation, only one thick line is shown in the figure, which does not mean there is only one communication bus or one type of communication bus.

The communication interface is used for communication between the terminal described above and other devices.

The memory can include a random access memory (RAM). Furthermore, the memory can include a non-volatile memory (NVM), for example at least one disk memory. Optionally, the memory can also be at least one storage device located away from the processor described above.

The aforementioned processor can be a general-purpose processor, including a central processing unit (CPU), a network processor (NP), and the like. The processor can also be a digital signal processor (DSP), an application specific integrated circuit (ASIC), a field-programmable gate array (FPGA) or other programmable logic device, a discrete gate or transistor logic device, a discrete hardware component.

The correspondence between the target display position in the video preview interface and the target video file described above is the correspondence between the target display position in the video preview interface and a storage address of the target video file.

Playing the target video file at the target display position in the video preview interface described above can comprise:
playing the target video file corresponding to the storage address contained in the correspondence at the target display position in the video preview interface.

Playing the target video file at the target display position in the video preview interface described above can comprise:
playing video frames of the target video file in positive order at the target display position in the video preview interface;
after the last video frame of the target video file is played, playing the video frames of the target video file in reverse order till a preset video frame;
returning to the playing video frames of the target video file in positive order, and stopping playing the target video file when obtaining a stop playing instruction.

Each of the video frames of the target video file described above contains a video frame identifier.

Playing the video frames of the target video file in reverse order till a preset video frame described above can comprise:

obtaining the last but one video frame of the target video file based on the video frame identifier contained in each of the video frames;

playing the video frames of the target video file in reverse order from the last but one video frame till the preset video frame.

The preset video frame described above is the second video frame of the target video file.

Figure 10:
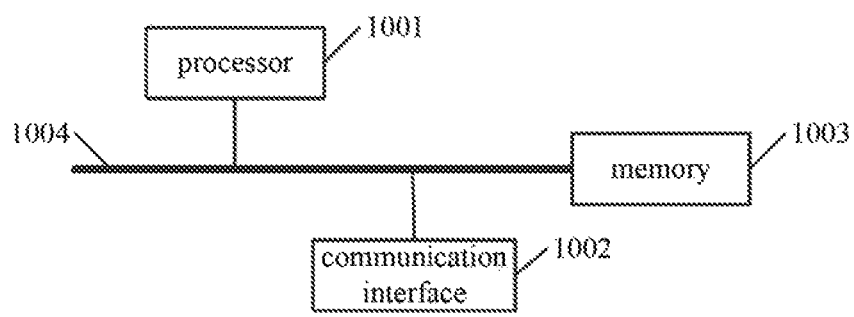
FIG. 10 is a schematic diagram of the structure of another terminal provided by an embodiment of the present application.

An embodiment of the present application provides another terminal, as shown in FIG. 10, which comprises a processor 1001, a communication interface 1002, a memory 1003 and a communication bus 1004, wherein the processor 1001, the communication interface 1002 and the memory 1003 communicate with each other via the communication bus 1004, the memory 1003 is used for storing a computer program;

the processor 1001 is used for performing the following process when executing the program stored on the memory 1003:

obtaining a video file to be released;

sending the video file to be released to a server, so that the server receives the video file to be released, selects a first preset number of video frames in the video file to be released, generates a target video file using the selected video frames, and for an interface identifier of a video preview interface, creates the correspondence between a display position in the video preview interface and the target video file, wherein a first terminal plays the target video file at the display position in the video preview interface based on the correspondence between the display position in the video preview interface and the target video file.

As can be seen, in the solution provided by the embodiment of the present application, the second terminal obtains a video file to be released and sends the video file to be released to a server, so that the server receives the video file to be released, selects a first preset number of video frames in the video file to be released, generates a target video file using the selected video frames, and for an interface identifier of a video preview interface, creates the correspondence between a display position in the video preview interface and the target video file, wherein a first terminal plays the target video file at the corresponding display position in the video preview interface based on the correspondence between the display position in the video preview interface and the target video file. Since the first terminal plays the target video file at the target display position in the video preview interface, the user can get more information about the content of the video file to be released from the target video file, so that the user experience is improved. Moreover, the user can select a video file to be released that he/she wants to release via the second terminal, so that the user experience is further improved.

The communication bus described with respect to the terminal above can be a peripheral component interconnect (PCI) bus, an extended industry standard architecture (EISA) bus, or the like. The communication bus can include an address bus, a data bus, a control bus, and the like. For representation, only one thick line is shown in the figure, which does not mean there is only one communication bus or one type of communication bus.

The communication interface is used for communication between the terminal described above and other devices.

The memory can include a random access memory (RAM). The memory can also include a non-volatile memory (NVM), for example at least one disk memory.

Optionally, the memory can also be at least one storage device located away from the processor described above.

The aforementioned processor can be a general-purpose processor, including a central processing unit (CPU), a network processor (NP), and the like. The processor can also be a digital signal processor (DSP), an application specific integrated circuit (ASIC), a field-programmable gate array (FPGA) or other programmable logic device, a discrete gate or transistor logic device, a discrete hardware component.

After obtaining a video file to be released, the method described above further comprises:

obtaining a target timestamp selected by a user.

Sending the video file to be released to a server comprises:

sending the video file to be released and the target timestamp to the server, so that the server receives the video file to be released and the target timestamp, determines a target video frame corresponding to the target timestamp in the video file to be released, and selects a first preset number of video frames, wherein the target video frame is taken as the first video frame of the first preset number of video frames.

Obtaining a target timestamp selected by a user described above can comprise:

displaying a progress bar for the video file to be released;

obtaining information of a position selected by the user on the progress bar;

determining the target timestamp selected by the user based on the information of the position, the length of the progress bar and the duration of the video file to be released.

The progress bar is a progress bar in picture form.

An embodiment of the present application provides a computer readable storage medium. The computer readable storage medium stores a computer program thereon. The computer program is executed by a processor to perform the following process:

obtaining a video file to be released;

selecting a first preset number of video frames in the video file to be released; generating a target video file using the selected video frames;

determining a target display position for the target video file in a video preview interface;

saving the correspondence between the target display position and the target video file, so that a first terminal logging in the server plays the target video file at the target display position in the video preview interface based on the correspondence.

As can be seen, in the solution provided by the embodiment of the present application, when the computer program is executed by a processor, the server obtains a video file to be released; selects a first preset number of video frames in the video file to be released; generates a target video file using the selected video frames; determines a target display position for the target video file in a video preview interface; and stores the correspondence between the target display position and the target video file so that the first terminal logging in the server plays the target video file at the target display position in the video preview interface based on the correspondence. Since the first terminal plays the target video file at the target display position in the video preview interface, the user can get more information about the content of the video file to be released from the target video file, so that the user experience is improved.

Obtaining a video file to be released can comprise:

obtaining a video file to be released sent by a second terminal.

Selecting a first preset number of video frames in the video file to be released comprises:
  selecting the first preset number of video frames starting from the start position of the video file to be released or selecting the first preset number of video frames in the video file to be released according to a preset rule.

Obtaining a video file to be released can comprise:
  receiving a video file to be released and a target timestamp sent by the second terminal, wherein the target timestamp is a timestamp selected by a user, which is obtained and sent by the second terminal.

Selecting a first preset number of video frames in the video file to be released comprises:
  determining a target video frame corresponding to the target timestamp in the video file to be released;
  selecting a first preset number of video frames, wherein the target video frame is taken as the first video frame of the first preset number of video frames.

Generating a target video file using the selected video frames can comprise:
  adding a second preset number of video frames at the end of the selected video frames, in reverse order, after the last video frame of the selected video frames to generate the target video file.

An embodiment of the present application provides another computer readable storage medium. The computer readable storage medium stores a computer program thereon. The computer program is executed by a processor to perform the following process:
  logging in a server so that the server sends pre-stored correspondence between a target display position in a video preview interface and a target video file to the first terminal; wherein the target video file is a video file that is generated by the server using a first preset number of video frames, wherein the first preset number of video frames are selected by the server in an obtained video file to be released;
  receiving the correspondence, and playing the target video file at the target display position in the video preview interface based on the correspondence.

As can be seen, in the solution provided by the embodiment of the present application, when the computer program is executed by a processor, the first terminal logs in a server so that the server sends pre-stored correspondence between a target display position in a video preview interface and a target video file to the first terminal; receives the correspondence and plays the target video file at the target display position in the video preview interface based on the correspondence. Since the first terminal plays the target video file at the target display position in the video preview interface, the user can get more information about the content of the video file to be released from the target video file, so that the user experience is improved.

The correspondence between the target display position in the video preview interface and the target video file is the correspondence between the target display position in the video preview interface and a storage address of the target video file.

Playing the target video file at the target display position in the video preview interface can comprise:
  playing the target video file corresponding to the storage address contained in the correspondence at the target display position in the video preview interface.

Playing the target video file at the target display position in the video preview interface can comprise:
  playing video frames of the target video file in positive order at the target display position in the video preview interface;
  after the last video frame of the target video file is played, playing the video frames of the target video file in reverse order till a preset video frame;
  returning to the playing video frames of the target video file in positive order, and stopping playing the target video file when obtaining a stop playing instruction.

Each of the video frames of the target video file contains a video frame identifier.

Playing the video frames of the target video file in reverse order till a preset video frame can comprise:
  obtaining the last but one video frame of the target video file based on the video frame identifier contained in each of the video frames;
  playing the video frames of the target video file in reverse order from the last but one video frame till the preset video frame.

The preset video frame is the second video frame of the target video file.

An embodiment of the present application provides another computer readable storage medium. The computer readable storage medium stores a computer program thereon. The computer program is executed by a processor to perform the following process:
  obtaining a video file to be released;
  sending the video file to be released to a server, so that the server receives the video file to be released, selects a first preset number of video frames in the video file to be released, generates a target video file using the selected video frames, and for an interface identifier of a video preview interface, creates the correspondence between a display position in the video preview interface and the target video file, wherein a first terminal plays the target video file at the display position in the video preview interface based on the correspondence between the display position in the video preview interface and the target video file.

As can be seen, in the solution provided by the embodiment of the present application, when the computer program is executed by a processor, the second terminal obtains a video file to be released and sends the video file to be released to a server, so that the server receives the video file to be released, selects a first preset number of video frames in the video file to be released, generates a target video file using the selected video frames, and for an interface identifier of a video preview interface, creates the correspondence between the display position in the video preview interface and the target video file, wherein a first terminal plays the target video file at the corresponding display position in the video preview interface based on the correspondence between the display position in the video preview interface and the target video file. Since the first terminal plays the target video file at the target display position in the video preview interface, the user can get more information about the content of the video file to be released from the target video file, so that the user experience is improved. Moreover, the user can select a video file to be released that he/she wants to release via the second terminal, so that the user experience is further improved.

After obtaining a video file to be released, the method described above further comprises:
  obtaining a target timestamp selected by a user.

Sending the video file to be released to a server comprises:
  sending the video file to be released and the target timestamp to the server, so that the server receives the video file to be released and the target timestamp, determines a target video frame corresponding to the target timestamp in the video file to be released, and selects a first preset number of video frames, wherein the target video frame is taken as the first video frame of the first preset number of video frames.

Obtaining a target timestamp selected by a user can comprise:
  displaying a progress bar for the video file to be released;
  obtaining information of a position selected by a user on the progress bar;
  determining the target timestamp selected by the user based on the information of the position, the length of the progress bar and the duration of the video file to be released.

The progress bar is a progress bar in picture form.

An embodiment of the present application provides a first computer program product which performs the following process when being executed:
  obtaining a video file to be released;
  selecting a first preset number of video frames in the video file to be released; generating a target video file using the selected video frames;
  determining a target display position for the target video file in a video preview interface;
  storing the correspondence between the target display position and the target video file, so that a first terminal logging in the server plays the target video file at the target display position in the video preview interface based on the correspondence.

Obtaining a video file to be released can comprise:
  obtaining a video file to be released sent by a second terminal.

Selecting a first preset number of video frames in the video file to be released comprises:
  selecting the first preset number of video frames starting from the start position of the video file to be released or selecting the first preset number of video frames in the video file to be released according to a preset rule.

Obtaining a video file to be released can comprise:
  receiving a video file to be released and a target timestamp sent by the second terminal, wherein the target timestamp is a timestamp selected by a user, which is obtained and sent by the second terminal.

Selecting a first preset number of video frames in the video file to be released comprises:
  determining a target video frame corresponding to the target timestamp in the video file to be released;
  selecting a first preset number of video frames, wherein the target video frame is taken as the first video frame of the first preset number of video frames.

Generating a target video file using the selected video frames can comprise:
  adding a second preset number of video frames at the end of the selected video frames, in reverse order, after the last video frames in the selected video frames to generate the target video file.

An embodiment of the present application provides a second computer program product which performs the following process when being executed:
  logging in a server so that the server sends pre-stored correspondence between a target display position in a video preview interface and a target video file to the first terminal; wherein the target video file is a video file that is generated by the server using a first preset number of video frames, wherein the first preset number of video frames are selected by the server in an obtained video file to be released;
  receiving the correspondence, and playing the target video file at the target display position in the video preview interface based on the correspondence.

The correspondence between the target display position in the video preview interface and the target video file is the correspondence between the target display position in the video preview interface and a storage address of the target video file.

Playing the target video file at the target display position in the video preview interface can comprise:
  playing the target video file corresponding to the storage address contained in the correspondence at the target display position in the video preview interface.

Playing the target video file at the target display position in the video preview interface can comprise:
  playing video frames of the target video file in positive order at the target display position in the video preview interface;
  after the last video frame of the target video file is played, playing the video frames of the target video file in reverse order till a preset video frame;
  returning to the playing video frames of the target video file in positive order, and stopping playing the target video file when obtaining a stop playing instruction.

Each of the video frames of the target video file contains a video frame identifier.

Playing the video frames of the target video file in reverse order till a preset video frame can comprise:
  obtaining the last but one video frame of the target video file based on the video frame identifier contained in each of the video frames;
  playing the video frames of the target video file in reverse order from the last but one video frame till the preset video frame.

The preset video frame is the second video frame of the target video file.

An embodiment of the present application provides a third computer program product which performs the following process when being executed:
  obtaining a video file to be released;
  sending the video file to be released to a server, so that the server receives the video file to be released, selects a first preset number of video frames in the video file to be released, generates a target video file using the selected video frames, and for an interface identifier of a video preview interface, creates the correspondence between a display position in the video preview interface and the target video file, wherein a first terminal plays the target video file at the display position in the video preview interface based on the correspondence between the display position in the video preview interface and the target video file.

After obtaining a video file to be released, the method described above further comprises:
  obtaining a target timestamp selected by a user.

Sending the video file to be released to a server comprises:
  sending the video file to be released and the target timestamp to the server, so that the server receives the video file to be released and the target timestamp, determines a target video frame corresponding to the target timestamp in the video file to be released, and selects a first preset number of video frames, wherein the target video frame is taken as the first video frame of the first preset number of video frames.

Obtaining a target timestamp selected by a user can comprise:
  displaying a progress bar for the video file to be released;
  obtaining information of a position selected by a user on the progress bar;
  determining a target timestamp selected by the user based on the information of the position, the length of the progress bar and the duration of the video file to be released.
  The progress bar is a progress bar in picture form.

It should be noted that, for embodiments of the apparatus, server, terminal, computer readable storage medium, and computer program product, since they are substantially similar to the embodiments of the method, their description is relatively simple, and for the related aspects, one only needs to refer to portions of the description of the embodiments of the method.

It should be noted that the relationship terms herein such as "first", "second" and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All the embodiments are described in corresponding ways, same or similar parts in the embodiments can be referred to one another, and the parts emphasized in each embodiment are differences to other embodiments. Especially for embodiments of a system, since they are similar to embodiments of a method, the description thereof is relatively simple; the similar parts could refer to the parts in the description of embodiments of the method.

The embodiments described above are merely preferred embodiments of the present application, and not intended to limit the scope of the present application. Any modifications, equivalents, improvements or the like within the spirit and principle of the application should be included in the scope of the application.

The invention claimed is:

1. A method for releasing a video file, which is applied to a server, comprising:
  obtaining a video file to be released;
  selecting a first preset number of video frames in the video file to be released;
  generating a target video file using the selected video frames;
  determining a target display position for the target video file in a video preview interface;
  storing the correspondence between the target display position and the target video file, so that a first terminal logging in the server plays the target video file at the target display position in the video preview interface based on the correspondence,
  wherein generating a target video file using the selected video frames comprises:
    adding a second preset number of video frames at the end of the selected video frames, in reverse order, after the last video frame of the selected video frames to generate the target video file.

2. The method of claim 1, wherein obtaining a video file to be released comprises:
  obtaining a video file to be released sent by a second terminal;
  selecting a first preset number of video frames in the video file to be released comprises:
    selecting the first preset number of video frames starting from the start position of the video file to be released or selecting the first preset number of video frames in the video file to be released according to a first preset rule.

3. The method of claim 1, wherein obtaining a video file to be released comprises:
  receiving a video file to be released and a target timestamp sent by a second terminal, wherein the target timestamp is a timestamp selected by a user, which is obtained and sent by the second terminal;
  selecting a first preset number of video frames in the video file to be released comprises:
    determining a target video frame corresponding to the target timestamp in the video file to be released;
    selecting the first preset number of video frames according to a second preset rule by taking the target video frame as the first video frame in the first preset number of video frames.

4. A server comprising a processor, a communication interface, a memory and a communication bus, wherein the processor, the communication interface and the memory communicate with each other via the communication bus;
  the memory is used for storing a computer program;
  the processor is used for implementing the method of claim 1 when executing the computer program stored on the memory.

5. A non-transitory computer readable storage medium storing a computer program thereon, wherein the computer program is executed by a processor to implement the method of claim 1.

6. A method for releasing a video file, which is applied to a first terminal, comprising:
  logging in a server so that the server sends pre-stored correspondence between a target display position in a video preview interface and a target video file to the first terminal, wherein the target video file is a video file that is generated by the server using a first preset number of video frames, wherein the first preset number of video frames are selected by the server in an obtained video file to be released;
  receiving the correspondence, and playing the target video file at the target display position in the video preview interface based on the correspondence,
  wherein the target video file is generated using the first preset number of video frames by;
    adding a second preset number of video frames at the end of the first preset number of video frames, in reverse order, after the last video frame of the first preset number of video frames.

7. The method of claim 6, wherein the correspondence between the target display position in the video preview interface and the target video file is the correspondence between the target display position in the video preview interface and a storage address of the target video file;
  playing the target video file at the target display position in the video preview interface comprises:

playing the target video file corresponding to the storage address contained in the correspondence at the target display position in the video preview interface.

8. The method of claim 6, wherein playing the target video file at the target display position in the video preview interface comprises:
    playing video frames of the target video file in positive order at the target display position in the video preview interface;
    after the last video frame of the target video file is played, playing the video frames of the target video file in reverse order till a preset video frame;
    returning to the playing video frames of the target video file in positive order, and when a stop playing instruction is obtained, stopping the playing of the target video file.

9. The method of claim 8, wherein each of the video frames of the target video file contains a video frame identifier;
    playing the video frames of the target video file in reverse order till a preset video frame comprises:
    obtaining the second to last video frame of the target video file based on the video frame identifier contained in each of the video frames;
    playing the video frames of the target video file in reverse order from the second to last video frame till the preset video frame.

10. The method of claim 9, wherein the preset video frame is the second video frame of the target video file.

11. A terminal comprising a processor, a communication interface, a memory and a communication bus, wherein the processor, the communication interface and the memory communicate with each other via the communication bus;
    the memory is used for storing a computer program;
    the processor is used for implementing the method of claim 5 when executing the computer program stored on the memory.

12. A non-transitory computer readable storage medium storing a computer program thereon, wherein the computer program is executed by a processor to implement the method of claim 6.

13. A method for releasing a video file, which is applied to a second terminal, comprising:
    obtaining a video file to be released;
    sending the video file to be released to a server, so that the server receives the video file to be released, selects a first preset number of video frames in the video file to be released, generates a target video file using the selected video frames, and for an interface identifier of a video preview interface, creates the correspondence between a display position in the video preview interface and the target video file, wherein a first terminal plays the target video file at the display position of the video preview interface based on the correspondence between the display position in the video preview interface and the target video file,
    wherein the target video file is generated using the selected video frames by;
    adding a second preset number of video frames at the end of the selected video frames, in reverse order, after the last video frame of the selected video frames.

14. The method of claim 13, wherein after obtaining a video file to be released, the method further comprises:
    obtaining a target timestamp selected by a user;
    sending the video file to be released to a server comprises:
    sending the video file to be released and the target timestamp to the server, so that the server receives the video file to be released and the target timestamp, determines a target video frame corresponding to the target timestamp in the video file to be released, and selects a first preset number of video frames, wherein the target video frame is taken as the first video frame of the first preset number of video frames.

15. The method of claim 14, wherein obtaining a target timestamp selected by a user comprises:
    displaying a progress bar for the video file to be released;
    obtaining information of a position selected by the user on the progress bar;
    determining the target timestamp selected by the user based on the information of the position, the length of the progress bar and the duration of the video file to be released.

16. The method of claim 15, wherein the progress bar is a progress bar in picture form.

17. A terminal comprising a processor, a communication interface, a memory and a communication bus, wherein the processor, the communication interface and the memory communicate with each other via the communication bus;
    the memory is used for storing a computer program;
    the processor is used for implementing the method of claim 13 when executing the computer program stored on the memory.

18. A non-transitory computer readable storage medium storing a computer program thereon, wherein the computer program is executed by a processor to implement the method of claim 13.

* * * * *